UNITED STATES PATENT OFFICE.

ROBERT B. HOWELL, OF OMAHA, NEBRASKA.

PIPE-CALKING COMPOSITION.

1,290,204.    Specification of Letters Patent.    Patented Jan. 7, 1919.

No Drawing.    Application filed May 19, 1917.    Serial No. 169,759.

*To all whom it may concern:*

Be it known that I, ROBERT B. HOWELL, a citizen of the United States, and a resident of Omaha, in the county of Douglas and State of Nebraska, have made an Improvement in Pipe-Calking Compositions, of which the following is a specification.

My invention relates to improvements in compositions of matter for making pipe joints, and it consists in materials combined in the form hereinafter described.

An object of my invention is to provide a composition which may take the place of lead, in the formation of joints of bell and spigot water pipe.

A further object of my invention is to provide a composition of matter of the type described which may be quickly fused, and at a relatively low temperature.

A further object of my invention is to provide a composition for calking pipe joints, which includes an element which is combustible, the composition being in such state, however, as to obviate the danger of combustion, while at the same time maintaining the relative proportions of the ingredients throughout the mass.

Other objects and advantages will appear in the following specification and the novel features of the invention will be particularly pointed out in the appended claims.

In carrying out my invention I make use of metalloids, one of these metalloids being sulfur. Intermixed with the sulfur is sand, and some material of substantially the same specific gravity as sulfur and chemically inert at ordinary temperatures with respect to the sulfur, such as pulverized coke. In practice forty-six (46) parts of sulfur, forty-six (46) parts of sand and eight (8) parts of the remaining material to-wit, carbon, such as coke, or graphite, are thoroughly mixed together. This mixture is then treated so as to bring it into granulated form. This may be done in any of a number of ways, one way being to melt the mixture, taking care that the substances are thoroughly incorporated, then to pour the melted mixture through a sieve or perforated plate into water. This will form globular particles, each of which consists of a mixture of ingredients in identically the same portions as the original mass.

The preferred form of the composition of matter is the granular form just described.

A composition consisting merely of the ingredients mixed in the proportions specified will not serve the purpose of this invention. In fact, the invention is designed to obviate certain objections to such a composition. It has been found that where the substances such as sand, sulfur and coke, are first mixed together and then transported to any considerable distance, these substances due, to the different specific gravities of the sand and sulfur, tend to collect, so that when the time comes to use the mixture, the ingredients will be distributed in different proportions in different parts of the mixture; thus the sand will tend to collect by itself, so that if one should take a measured amount from a given part of the mixture, that measured portion might consist largely of sand.

On the other hand, a block of the substance containing ingredients distributed in precisely the proportions specified would not at all fulfil the purposes of this invention, because one object is to provide a composition of matter which melts quickly without the danger of burning the sulfur. A solid block cannot be melted quickly without danger of burning the sulfur, while a granulated substance may be melted quickly without endangering the sulfur and at the same time the granulated form maintains the ingredients in the same relative proportions as when mixed originally. The granulation of the material therefore serves a double function.

While the granulation is preferably effected as above specified, I do not desire to limit myself to that method. A solidified block of previously melted material, as just mentioned, may be broken up and passed through a crushing mill to produce the material in granular form; in other words, the admixture of the material is initially stabilized by melting and thereafter granulated so that distinct bodies or granules each containing the proper proportion of the ingredients bound together will be produced.

I claim:

1. A composition for jointing pipes which consists of a mixture of a granular mass, each particle of the mass containing a mixture of sulfur, sand and a material of substantially the same specific gravity as sulfur, and which is relatively inert chemically to the sulfur.

2. A composition of matter for jointing pipes consisting of a granulated mass, each particle of the mass containing a mixture of sand, sulfur and a material having substantially the same specific gravity as the sulfur and chemically inert to the latter, the proportions of the ingredients in all the particles being identical.

3. A composition of matter for jointing pipes which consists of a granulated mass, each particle comprising a mixture of sand, sulfur and carbon.

4. A composition of matter for jointing pipes which consists of a granulated mass, each particle comprising a mixture of sand, sulfur and carbon in the following proportions: sand 46%, sulfur 46% and carbon 8%.

5. A composition for jointing pipes which consists of a mass produced by melting a mixture of sulfur, sand and carbon, the sulfur and sand being present in approximately forty-six parts each and carbon in eight parts.

6. A non-porous composition for jointing pipes which consists of an admixture of sulfur, silicious material and carbon, the carbon being present in about one twelfth of the entire mass, the same being stabilized by melting to prevent separation or stratification of the constituent elements.

ROBERT B. HOWELL.

Copies of this patent may be obtained for five cents each, by addressing the "Commissioner of Patents, Washington, D. C."